United States Patent [19]
Glance

[11] 3,709,316
[45] Jan. 9, 1973

[54] CAM ACTION SAFETY HOOD
[75] Inventor: Patrick M. Glance, Plymouth, Mich.
[73] Assignee: Ford Motor Company, Dearborn, Mich.
[22] Filed: Oct. 26, 1971
[21] Appl. No.: 192,454

[52] U.S. Cl. ............ 180/69 C, 280/150 B, 296/28 R
[51] Int. Cl. ............................................. B62d 25/10
[58] Field of Search..... 180/69 R, 69 C; 296/31 P, 28 R; 293/63, DIG. 3; 188/1 C; 280/150 B

[56] References Cited

UNITED STATES PATENTS 3,599,743 8/1971 Hull .................................. 180/69 C
3,643,755 2/1972 Gionet et al. ...................... 180/69 C Primary Examiner—Leo Friaglia
Assistant Examiner—D. M. Mitchell
Attorney—Keith L. Zerschling et al.

[57] ABSTRACT

Vehicle hood construction in which the hood in hinged at its front end to the front wall of the vehicle engine compartment and is latched at its rear end to the vehicle cowl structure forming the rear wall of the engine compartment. The side walls of the engine compartment and the longitudinal edges of the hood are provided with cam means comprising complementary coacting ramp or cam surfaces. If the hood is shoved rearwardly under vehicle collision conditions, an upward buckling of the hood is induced by the cam means which has the effect of foreshortening the hood. This acts as an energy absorption device and prevents unlatching of the hood rear edge and subsequent movement of the rear edge toward the vehicle passenger compartment.

10 Claims, 5 Drawing Figures

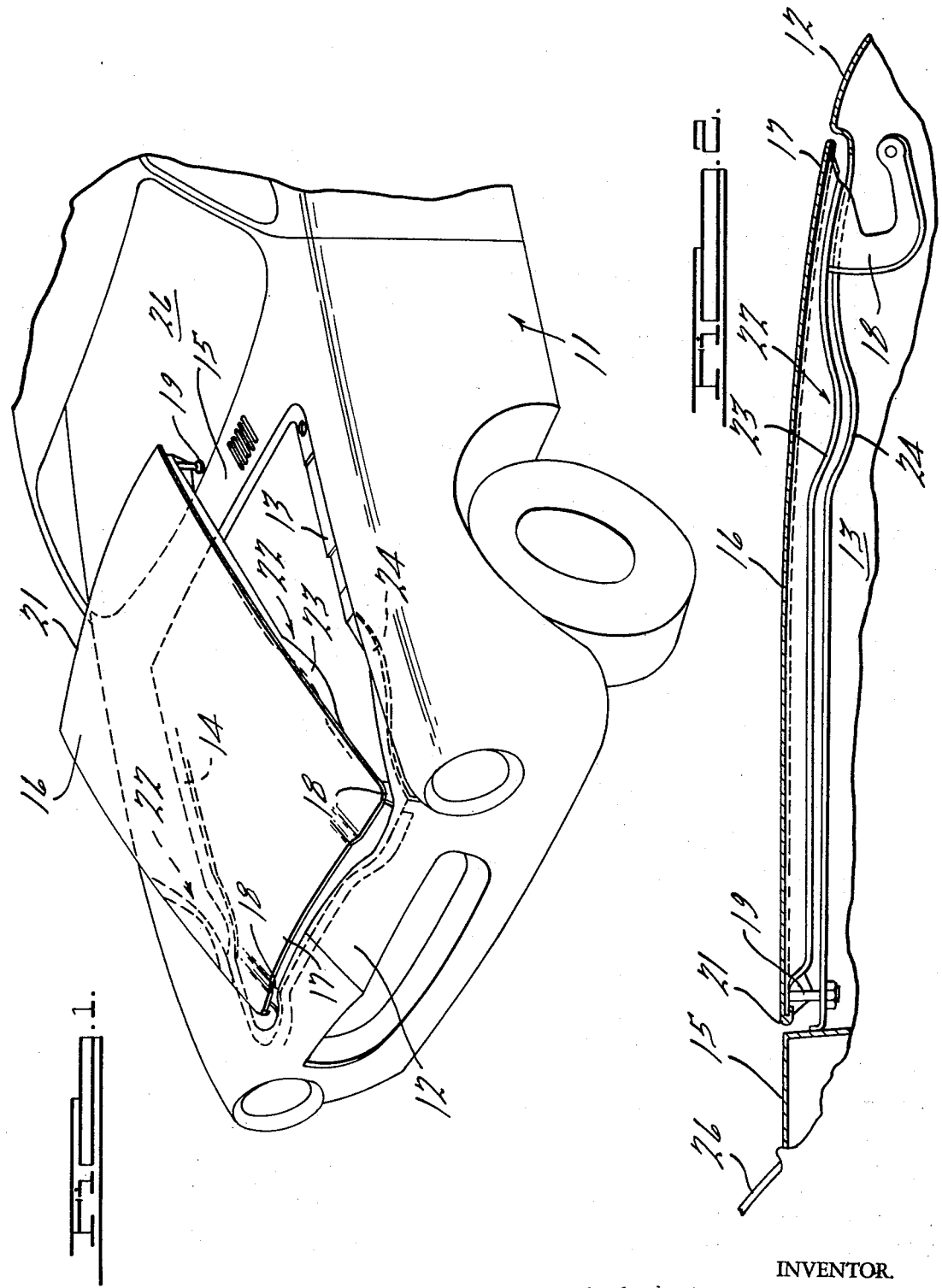

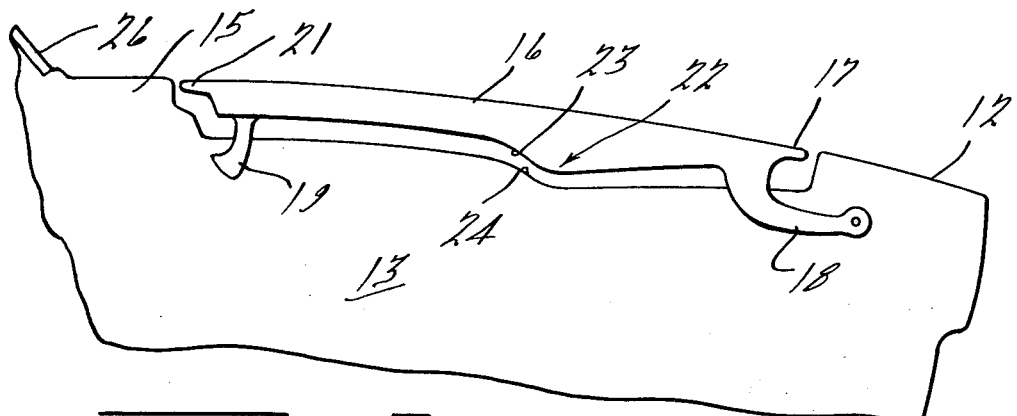
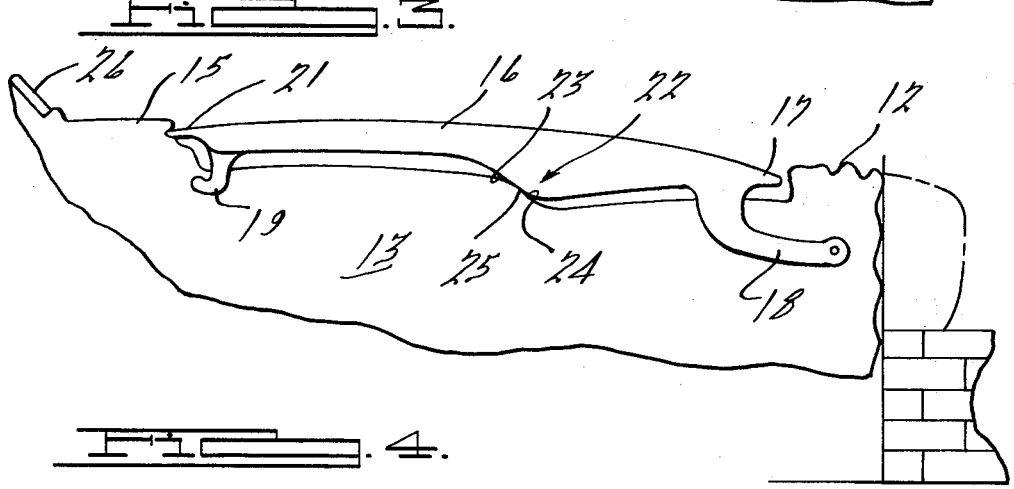
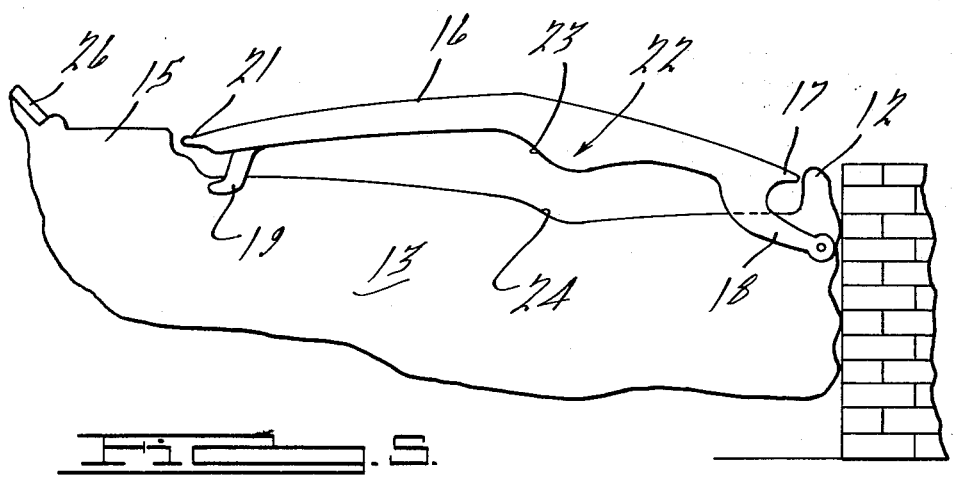

CAM ACTION SAFETY HOOD

BACKGROUND OF THE INVENTION

There are at least three common ways in which a vehicle engine compartment hood or closure can be hinged to provide access to the engine compartment. The closure or hood can be hinged at its front edge, at a side edge or at its rear edge. Each method of hinging has certain inherent disadvantages.

For example, the closure or hood hinged at the rear edge has the disadvantage that sometime the latches located at the front edge fail or are improperly latched. At high speed, the front edge of the closure or hood then is able to pop open. The closure or hood is then ripped off by the wind acting under the closure or hood as a sail. Side-hinged closures or hoods have the disadvantage that they block access to the engine compartment on the side from which hinged. Front-hinged hoods or closures have the disadvantage that they are able to cause damage to the vehicle windshield and also to the occupants in the vehicle passenger compartment when the vehicle is involved in a front end or head-on collision. The reason for this is that as the front end of the vehicle collapses, the hood or closure is driven straight back. Frequently, the rear latches fail as the buckling of the hood or closure occurs. The rear edge of the hood or closure is then driven into the windshield causing the latter to fracture. If the impact is severe enough, the closure or hood is able to penetrate through the windshield opening into the vehicle passenger compartment, compounding the injury to the occupants.

SUMMARY OF THE INVENTION

The vehicle engine compartment structure embodying the present invention comprises a front wall, side fender aprons, the front cowl structure and an elongated top closure or hood panel. Hinge means hinge one end of the closure or hood panel to the front wall of the engine compartment. The closure or hood panel is latched by releasable latch means to the other end of the engine compartment which generally is defined by the forward wall of the cowl structure. A cam means is interposed between side portions of the closure or hood panel and upper portions of the fender aprons. The cam means is effective upon an impact force being applied to the front end of the closure to create a vertical force component which initiates an upward buckling of the closure or hood panel. Because of this upward buckling, the closure or hood panel is adapted to function as an energy absorbing device to prevent unlatching of the hood and movement of the latter up and over the cowl structure and through the windshield into the passenger compartment.

DESCRIPTION OF THE DRAWINGS

Other objects, advantages and features of the present invention can be made more apparent as this description proceeds, reference being had to the accompanying drawings, wherein:

FIG. 1 is a fragmentary perspective view of the front end of a motor vehicle equipped with a hood panel or closure embodying the present invention;

FIG. 2 is a vertical section through the upper portion of the engine compartment and hood panel; and FIGS. 3, 4 and 5 are diagrammatic sketches illustrating the function of the present invention upon the front end of a vehicle impacting a barrier or other object.

DETAILED DESCRIPTION OF THE INVENTION

Referring now to the drawings, there is illustrated in FIG. 1 a portion of a vehicle body, generally designated 11. The vehicle body 11 has at its front end an engine compartment structure comprising a front wall 12, side fender aprons 13 and 14, a rear cowl structure 15 and an elongated closure or hood panel 16.

The closure or hood panel 16 is hinged at its front end 17 to the front wall structure 12 of the engine compartment by conventional hinge devices, diagrammatically illustrated at 18. Conventional latch devices, diagrammatically illustrated at 19, releasably latch the closure or hood panel 16 rear end 21 to suitable keeper devices (not shown) mounted in suitable relationship to the cowl structure.

The foregoing briefly summarizes conventional structure related to any front-hinged closure or hood panel for an engine compartment.

Through barrier crash tests in which vehicles are driven head-on into an immovable barrier, it has been found that the front-hinged closure or hood panels have one serious disadvantage. As the front end of the vehicle collapses, the closure or hood panel 16 is shoved rearwardly and begins to buckle forward of the latch devices latching the closure or hood panel to the cowl structure. As the buckling progresses, the latch devices are placed under high stress conditions and frequently fail so that the latched end of the closure or hood panel breaks away from the cowl structure. It then has a tendency to pass up and over the cowl structure into the windshield causing the latter to be fractured. If the front end impact is severe enough, the hood panel will then continue its rearward movement and pass through the broken windshield area into the passenger compartment in a position to do injury to the occupants of the front seat of the vehicle.

Accordingly, it is an object of the present invention to provide a closure or hood panel construction and arrangement in which the area of buckling is predetermined so that the buckling will occur nearer the front end of the closure or hood panel or at least no further back than the midpoint of the closure or hood panel. This is accomplished by providing a cam means, generally designated 22, effective to induce upward buckling in the closure or hood panel intermediate its ends. The upward buckling occurs in response to an impact force being applied to the front end of the closure or hood panel which force would tend to drive the latter longitudinally rearward toward the cowl structure.

The cam means 22 comprises first and second complementary ramps 23 and 24. It will be understood that there are two pairs of such cam means 22, each pair being located at a side of the engine compartment and between the front ends 17 of the closure or hood panel 16 and the longitudinal midpoint of the latter. The ramp 23, which may be considered a convex ramp, is in vertical alignment with the ramp 24, which may be considered a concave ramp.

Referring now to FIGS. 3-5 inclusive, the function and operation of the cam means 22 is diagrammatically represented. FIG. 3 illustrates the relationship of the components in normal operative conditions. The closure or hood panel 16 is shown closing the engine compartment and being supported at its front end 17 by the hinge device 18 and at its rear end by the latch device 19. The cam means 22 is shown with its two ramp sections 23 and 24 in vertical alignment to each other.

FIG. 4 illustrates the relationship of the components upon the vehicle impacting an immovable barrier. The first thing that happens is that the sheet metal of the front end 12 of the vehicle collapses. The hinge device 18 then begins to move rearwardly bringing the ramp sections 23 and 24 in contact with each other at the point 25. Normally, the closure or hood panel 16 begins to flex as the rear edge 21 abuts the front face of the cowl structure 15. The forces on the latch devices 19 begin to distort or deform the latch components. In the usual front-end hinged hood construction, continued deformation of the front end of the vehicle results in the latch devices failing and the rear edge 21 of the hood panel deforming to an extent such that the panel moves upwardly and over the cowl structure into the vehicle windshield, indicated at 26. If the collapse of the vehicle front end is excessive, as a result of a high speed impact against a barrier, the rear end 21 of the hood panel will hit the windshield 26 and cause the latter to fracture. It is also possible that the closure or hood panel will actually penetrate into the vehicle passenger compartment.

With the present invention, upon the ramp sections 23 and 24 coming into contact with each other, a vertical component of force is created substantially at the contact point 25. This vertical force created at the point 25 initiates an upward buckling of the hood panel 16, see FIG. 15. Depending upon the placement of the ramps 23 and 24, the buckling can be controlled to occur at predetermined distance from the front end of the vehicle. This distance preferably lies in the front half area of the hood panel. By controlling the buckling of the hood panel, the latter is able to function as an energy absorbing device. It has the further function that it prevents unlatching of the hood and movement of the latter up and over the cowl structure into the passenger compartment through the windshield. By relieving the shear stresses on the hood latch mechanism components, these units can be designed within reasonable size limitations to function for their primary purpose which is to hold the hood down over the engine compartment.

To further control the location of the buckling action, the structural members forming the hood panel may be designed to be weaker forward of the midsection than those in the rear half of the hood panel.

It is to be understood that this invention is not limited to the exact construction illustrated or described above, but that various changes and modifications may be made without departing from the spirit and scope of the invention as defined by the appended claims.

I claim:

1. A vehicle engine compartment structure comprising a front wall, side fender aprons, a rear cowl structure and an elongated top closure,
   hinge means hinging one end of the closure to the front wall,
   latch means releasably latching the other end of the closure to the cowl structure,
   and cam means interposed between side portions of the closure and upper portions of the fender aprons effective to induce upward buckling in the closure intermediate its ends upon an impact force being applied to the front end of the closure tending to drive the latter longitudinally rearwardly toward the cowl structure.

2. A vehicle engine compartment structure according to claim 1, in which:
   the cam means comprises a first ramp formed in the upper edge of each side fender apron,
   and a second ramp formed in each side of the closure complementary to and in vertical alignment with a first ramp in a respective side apron.

3. A vehicle engine compartment structure according to claim 2, in which:
   the weakest section of the closure is at or forward of the longitudinal center of the closure.

4. A vehicle engine compartment structure according to claim 1, in which:
   the weakest section of the closure is at or forward of the longitudinal center of the closure.

5. Hood construction for the engine compartment of a vehicle body comprising:
   an elongated hood panel,
   hinge means hinging the hood panel to vehicle body structure at the forward end of the engine compartment,
   latch means releasably latching the hood to vehicle body structure at the rear end of the engine compartment,
   and cam means interposed between vehicle body structure forming the side of the engine compartment and the adjacent edge portions of the hood panel,
   cam means being effective to induce upward buckling in the hood panel intermediate its end upon an impact force being applied to the front end of the hood panel,
   the buckling of the hood panel foreshortening the latter and preventing substantial movement of the rear end of the hood panel over the rear end of the engine compartment.

6. Hood construction according to claim 5, in which:
   a cam means comprises a first ramp formed in the upper edge of each side wall of the engine compartment,
   and a second ramp formed in each adjacent edge portion of the elongated hood panel.

7. Hood construction according to claim 6, in which:
   the first and second ramps are complementary to and vertically aligned with each other.

8. Hood construction according to claim 7, in which:
   the weakest section of the hood is at or forward of the longitudinal center of the hood.

9. Hood construction according to claim 5, in which:
   the weakest section of the hood is intermediate the front end and center thereof.

10. A vehicle engine compartment structure comprising a front wall, side fender aprons, a rear cowl structure and an elongated hood panel,
    hinge means hinging one end of the hood panel to the front wall,
    latch means releasably latching the other end of the closure to the cowl structure, and cam means interposed between side portions of the hood panel and upper portions of the fender aprons, the cam means being effective upon an impact force being applied to the front end of the hood panel to create a vertical force component which initiates an upward buckling of the hood panel, whereby the hood panel functions as an energy absorbing device and resists unlatching of the hood and movement of the latter up and over the cowl structure into the passenger compartment through the windshield.

* * * * *